United States Patent
Pettersson et al.

(10) Patent No.: US 10,401,144 B2
(45) Date of Patent: Sep. 3, 2019

(54) COORDINATE MEASURING MACHINE HAVING A CAMERA

(71) Applicants: Bo Pettersson, London (GB); Knut Siercks, Mörschwil (CH); Eugen Voit, Au (CH); Jürg Hinderling, Marbach (CH); Benedikt Zebhauser, Rorschach (CH); Klaus Schneider, Dornbirn (AT); Pascal Jordil, Ecoteaux (CH)

(72) Inventors: Bo Pettersson, London (GB); Knut Siercks, Mörschwil (CH); Eugen Voit, Au (CH); Jürg Hinderling, Marbach (CH); Benedikt Zebhauser, Rorschach (CH); Klaus Schneider, Dornbirn (AT); Pascal Jordil, Ecoteaux (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 208 days.

(21) Appl. No.: 14/363,098

(22) PCT Filed: Dec. 6, 2012

(86) PCT No.: PCT/EP2012/074710
§ 371 (c)(1),
(2) Date: Jun. 5, 2014

(87) PCT Pub. No.: WO2013/083730
PCT Pub. Date: Jun. 13, 2013

(65) Prior Publication Data
US 2015/0049186 A1    Feb. 19, 2015

(30) Foreign Application Priority Data
Dec. 6, 2011 (EP) .................................. 11192215

(51) Int. Cl.
*G01B 21/04* (2006.01)
*G05B 19/401* (2006.01)
(Continued)

(52) U.S. Cl.
CPC .......... *G01B 11/005* (2013.01); *G01B 21/047* (2013.01); *G05B 19/401* (2013.01);
(Continued)

(58) Field of Classification Search
None
See application file for complete search history.

(56) References Cited

U.S. PATENT DOCUMENTS 5,251,156 A * 10/1993 Heier ................... G01B 11/005
33/503
6,486,963 B1 * 11/2002 Holec ................... G01B 11/24
356/601
(Continued)

FOREIGN PATENT DOCUMENTS

CN  101000499 A  7/2007
CN  101065785 A  10/2007
(Continued)

OTHER PUBLICATIONS

Sato et al., "A human-robot interface using an interactive hand pointer that projects a mark in the real work space", Robotics and Automation, 2000, vol. 1, Apr. 24, 2000 pp. 589-595.
(Continued)

*Primary Examiner* — Mikhail Itskovich
(74) *Attorney, Agent, or Firm* — Maschoff Brennan

(57) ABSTRACT

A coordinate measuring machine (1) for determining at least one spatial coordinate of a measurement point of an object (15) to be measured, comprising a base (5) and a drive mechanism, adapted to drive a probe head (13) in a manner such that the probe head (13) is capable to move relative to
(Continued)

the base (5) for approaching a measurement point, characterized by a first range camera (3, 33) having a range image sensor with a sensor array, wherein the range camera (3, 33) is adapted to be directed to the object (15) for providing a range image (23) of the object (15), and wherein range pixels of the range image are used for creating a point cloud with 3D-positions of target points of the object (15), and a controller, adapted to control the drive mechanism on the basis of 3D-positions of the target points.

23 Claims, 9 Drawing Sheets

(51) Int. Cl.
    *G06F 3/05*     (2006.01)
    *G01B 11/00*     (2006.01)
    *G06F 3/00*     (2006.01)
    *G06F 3/03*     (2006.01)

(52) U.S. Cl.
    CPC ............ *G06F 3/005* (2013.01); *G06F 3/0304* (2013.01); *G05B 2219/37193* (2013.01); *G05B 2219/37237* (2013.01); *Y02P 90/265* (2015.11)

(56) References Cited

U.S. PATENT DOCUMENTS

| | | |
|---|---|---|
| 8,255,184 B2 | 8/2012 | Chang et al. |
| 8,638,984 B2 | 1/2014 | Roithmeir |
| 8,650,939 B2 | 2/2014 | Matsumiya et al. |
| 2002/0118893 A1* | 8/2002 | Nguyen ............. G01N 21/9515 382/294 |
| 2004/0109205 A1 | 6/2004 | Asano et al. |
| 2006/0007449 A1 | 1/2006 | Christoph et al. |
| 2006/0235566 A1 | 1/2006 | Christoph et al. |
| 2008/0163054 A1* | 7/2008 | Pieper ................. G06F 19/3437 715/706 |
| 2009/0055024 A1* | 2/2009 | Kay ....................... B25J 9/1697 700/259 |
| 2009/0196491 A1 | 8/2009 | Stainlay et al. |
| 2010/0103106 A1* | 4/2010 | Chui ....................... G06F 3/017 345/166 |
| 2011/0119025 A1 | 5/2011 | Fetter et al. |
| 2012/0275688 A1 | 11/2012 | Stainlay et al. |

FOREIGN PATENT DOCUMENTS

| | | |
|---|---|---|
| CN | 101871775 A | 10/2010 |
| CN | 102042813 A | 5/2011 |
| CN | 204027541 U | 12/2014 |
| DE | 19805155 A1 | 8/1999 |
| DE | 199 30 087 A1 | 1/2001 |
| DE | 10 2005 017940 A1 | 11/2006 |
| DE | 102005017940 A1 | 11/2006 |
| DE | 10 2006 022 501 A1 | 11/2007 |
| DE | 102010014423 A1 | 10/2011 |
| DE | 102012103627 A1 | 10/2012 |
| EP | 1 537 959 A2 | 6/2005 |
| EP | 2312262 A2 | 4/2011 |
| EP | 2 705 935 A1 | 3/2014 |
| JP | 2004-093190 A | 3/2004 |
| WO | 2004055475 A2 | 7/2004 |
| WO | 2008/104082 A1 | 9/2008 |
| WO | 2009/127526 A1 | 10/2009 |
| WO | 2009129916 A1 | 10/2009 |
| WO | 2014/128299 A1 | 5/2014 |

OTHER PUBLICATIONS

European Search Report dated Mar. 29, 2012 as received in Application No. EP 11 19 2215.
Soshi et al.,"An Architecture for Gesture Based Control of Mobile Robots", Proceedings of the IEEE/RSJ International Conference on Intelligent Robots and Systems (IROS'99), Oct. 1999, pp. 851-857.
Subramanian et al., "Integrating a Vision System With a Coordinate Measuring Machine to Automate the Datum Alignment Process", Proceedings of ASME2005: International Design Engineering Technical Conferences & Computers and Information in Engineering, Sep. 24, 2005, pp. 1-7.
Foix et a. (2007) Exploitation of Time-of-Flight (ToF) Cameras IRI Technical Report. Institut de Rob'otica i Inform'atica Industrial (IRI) (2007).
"Faro Arm". http://www.faro.com/en-us/products/metrology/measuring-arm-faroarm/overview. retrieved Jan. 18, 2017.
"Faro Laser Tracker" http://www.faro.com/en-us/products/metrology/faro-laser-tracker/overview. retrieved Jan. 18, 2017.
Foix et al. Lock-in Time-of-Flight (ToF) Cameras: A Survey. IEEE Sensors Journal, vol. 11, No. 3, Mar. 2011. (2011).
"Measuring wiht Light and Sight" http://www.sme.org/MEMagazine/Article.aspx?id=21179&taxid=1424. retrieved Jan. 18, 2017.
Pia Breuer. Entwicklung einer prototypischen Gestenerkennung in Echtzeit unter Verwendung einer IRTiefenkamera. Institut für Computervisualistik Arbeitsgruppe Computergraphik. (2005).
S. B. Gokturk et al., "A Time-Of-Flight Depth Sensor-System Description, Issues and Solutions", IEEE Computer Vision and Pattern Recognition Workshop, CVPRW 2004 (Jun. 2, 2004).
P. Breuer et al., "Hand Gestrure Recognition with a novel IR Time-of-Flight Range Camera—A pilot studf", Proceedings of the 3rd International Conference on Computer Vision/Computer Graphics, VOl. 4418, pp. 247-260, Mar. 2007.
Y. Takeuchi et al., "Automatic Measurement of 3-Dimensional Coordinate Measuring Machine" Means of CAD and Image Data, Annals of the CIRP, vol. 39, Jan. 15, 1990.
http://en.wikipedia.org/wiki/Range_miaging, Ausdruck aus der WayBackMaschine unter http://web.archive.org, Stand 23. Nov. 2010.
Cristiano Niclass, "Auszug aus Single-Photon Image Sensors in CMOS" Picosecond Resolution for Three-Dimensional Imaging, 2008.

* cited by examiner

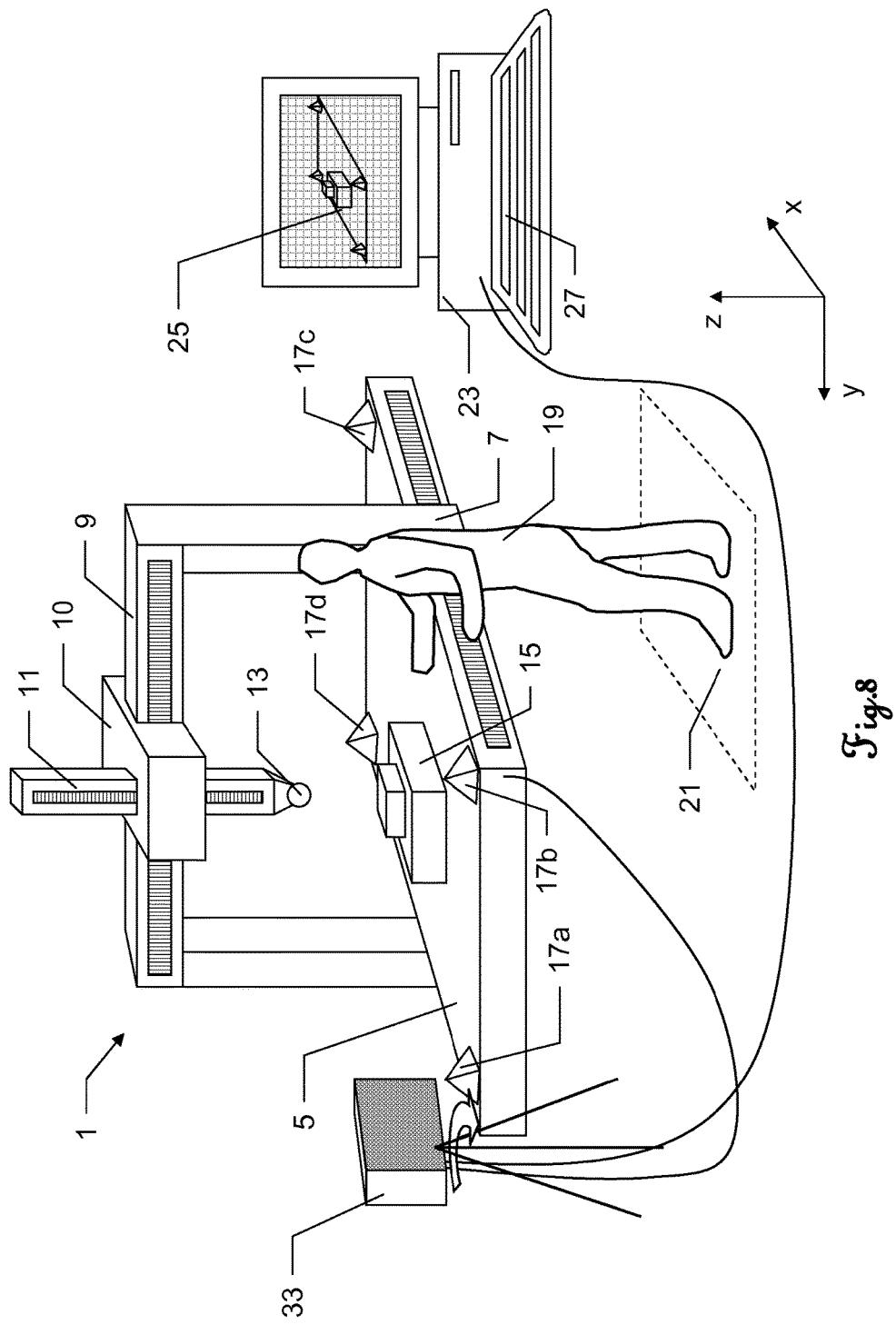

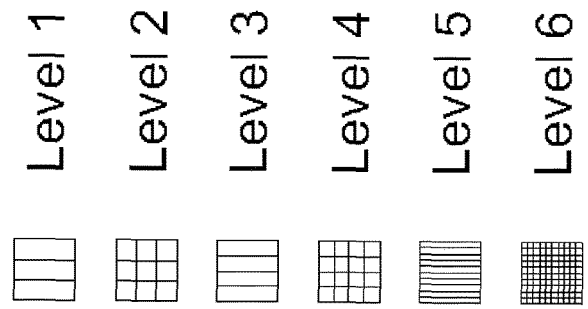
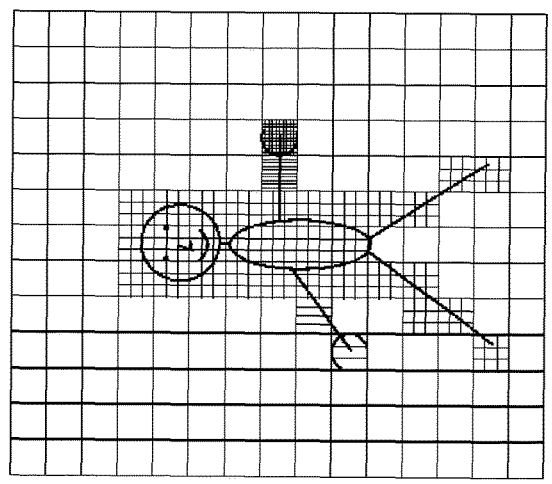
Fig. 9b
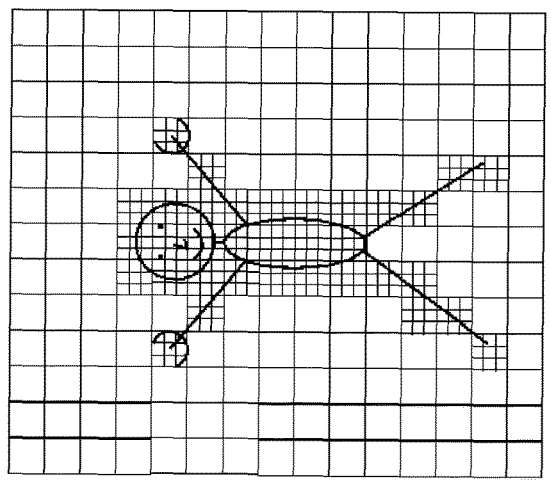
Fig. 9a

COORDINATE MEASURING MACHINE HAVING A CAMERA

FIELD OF THE INVENTION

The present invention generally pertains to a coordinate measuring machine capable to determine at least a spatial coordinate of a measurement point, and in particular to a coordinate measuring machine having a range camera comprising a range image sensor.

It is common practice to inspect a workpiece after its production to determine the accuracy of the production process, that is, workpiece dimensions, correctness of angles, etc. For instance, such a measurement can be performed using a coordinate measuring machine.

For inspection the workpiece is put on a base of such a coordinate measuring machine and a probe head being movable relative to the base is led to predetermined measurement points of the workpiece to obtain the exact coordinate data of these points. Thus, it is possible to determine the production accuracy of the workpiece.

In a conventional 3-D measurement machine, the probe head is supported for movement along three mutually perpendicular axes (in directions X, Y and Z). Thereby, the probe head can be guided to any arbitrary point within the working volume of the coordinate measuring machine.

In order to determine the coordinates, known measurement means capable to determine the probe head's distance from a known point of origin are employed. For instance, scales or other suitable measuring means are used for this purpose. The obtained coordinate data can then be stored in a memory such as a RAM and used for further processing.

With rather complicated structures of the workpiece, however, there arises a problem that it is cumbersome to guide the probe head to the selected target points. That is, it is required to timely reduce the movement speed of the probe head in order to prevent damage of the probe head or of the workpiece due to a too strong impact, when the probe head gets into abutment against the workpiece. In particular such a problem may arise with a fully automated coordinate measuring machine.

Thus, there is need for a coordinate measuring machine capable to achieve fast determination of coordinate data of selected target points, and capable to reduce a risk of damage of a probe head or a work piece to be measured. Some embodiments of the current invention provide such a coordinate measuring machine.

Some embodiments of the invention provide for a coordinate measuring machine that enables the user to control a measuring process of a coordinate measuring machine without contact.

BACKGROUND

According to a first aspect of the invention, a coordinate measuring machine for determining at least one spatial coordinate of a measurement point of an object to be measured comprises a base, a probe head adapted to approach the measurement point and a drive mechanism adapted to drive the probe head in a manner such that the probe head is capable to move relative to the base for approaching the measurement point. The CMM furthermore comprises a frame structure, to which the probe head is attached, the frame structure being movable in a horizontal and a vertical direction. Furthermore, the coordinate measuring machine according to the invention has a first camera. The camera is adapted to be directed to a measuring volume for providing at least a first image of at least a first part of the measuring volume, wherein the measuring volume represents a particular volume inside which the at least one spatial coordinate of the measurement point is determinable as to a design of the coordinate measuring machine, in particular as to a provided mobility of the probe head. Moreover, a controller of the coordinate measuring machine is adapted to control the drive mechanism on the basis of image data derived from the at least first image.

According to a specific embodiment of the invention the first camera is built as a first range camera having a range image sensor with a sensor array. The range camera is adapted to be directed to the object to be measured and is capable to provide the at least first image as a range image of the object to be measured. Range pixels of the range image correspond to a 3D-position of a target point of the object to be measured and are used as the image data for the creation of a point cloud of the object to be measured. Furthermore, the controller of the coordinate measuring machine serves to control the drive mechanism on the basis of the 3D-positions of the target points.

Range imaging in general is known as a technology which is used to produce a 2D-image showing the distance to points in a scene from a specific point. The resulting image which is generally called range image has pixel values which correspond to the distance of the respective target point at the object.

For instance, brighter values mean shorter distances or vice versa. It is even possible to properly calibrate the sensor producing such a range image which enables that pixel values can be given directly in physical units such as meters. For each of the pixels of the range image (range pixels) one separate sensor capable to measure a distance is assigned. Since the distance of the target point assigned to the respective sensor (pixel) is known, the 3D-position of the target point can be exactly determined.

Thus, by using the range imaging technology, it is possible to identify each of measurement points of an object to be measured, and to even determine each measurement points' 3D-data. However, while the 3D-positions determined by this manner might not be sufficiently accurate, because the amount of pixels of a range image can be limited, the information is sufficient to determine the shape of the object to be measured in the range image.

Thus, by using the 3D-positions of the target points, a controller can adjust a drive mechanism for driving the probe head in a manner to avoid severe impacts which could damage the probe head. Rather, by using the 3D-positions of the target points, the probe head can be made to approach the object to be measured with a comparably low speed, whereas in areas without the risk of an impact, that is, at greater distances from the object to be measured, the probe head can be moved with a comparably high speed. In order to overcome accuracy problems caused by the restricted number of available image points, advantageously, the range image can be overlaid with a real image of the object to be measured.

Thus, it is possible to perform the measuring of the measurement points of the object to be measured in a shorter time, because the 3D-positions of the measurement points constituting the object to be measured are known. Therefore, when getting close to one of these measurement points, the speed of the drive mechanism driving the probe head can be minimized, the moving direction of the probe head can be changed or other suitable measures can be taken.

Advantageously, the coordinate measuring machine may comprise a probe head position determining means. This probe head position determining means is capable to determine the 3D-position as well as a moving direction of the probe head. By learning the position of the probe head, the controller is even more capable to control the movement speed of the probe head by controlling the drive mechanism in dependency of the probe head's 3D-position and moving direction.

For instance, the probe head position determining means can use a sequence of range images, in which changing pixel values corresponding to the probe head's position are used for determining the distance from the probe head to the object to be measured. Thereby it is possible to accurately control the drive mechanism to be in the optimum speed range without the necessity to store the 3D-positions of the target points. Thereby, memory as well as time for calculating the positional relation between the probe head and the object to be measured can be advantageously avoided.

According to the first aspect of the invention, furthermore, the controller can be adapted to control a movement path of the probe head via the drive mechanism on the basis of the 3D-positions of the target points. That is, on the basis of the information provided by the range image, the controller can determine an optimum movement path for the probe head from the current measurement point to the subsequent measurement point. Thereby, since the shape of the object to be measured is known from the range image, the probe head can be controlled to move on the shortest possible movement path with the highest possible speed.

In order to move the probe head relatively to the base, either the base can be movable in a horizontal and a vertical direction, or the probe head can be attached to a frame structure being movable in a horizontal and a vertical direction. Furthermore, the base can be rotatable. This feature enables that a range image of the side of the object not facing the range camera can be taken after the base has been rotated. Thereby it is possible to avoid an impact against obstacles on the objects to be measured, which can be present on the side not facing to the range camera.

Advantageously, a range camera can be provided in an area close to the probe head and can be capable to move together with the probe head. The range camera for instance can be provided on the same frame element as the probe head, e.g. a vertical rod, or on a side arm of this element.

As a result, measures can be taken, e.g. to prevent a collision of the probe head and/or to adjust the measurement path, if the distance between the objects to be measured and the camera moving together with the probe head falls below a determined threshold value. This threshold value for instance can be expressed by a certain brightness value of the pixels corresponding to the objects to be measured.

This means that, for instance, if the brightness of the pixels achieves a predetermined level corresponding to the threshold value, the controller causes the drive mechanism to reduce the movement speed of the probe head. In particular, the camera can be provided in a rotatable manner and, thus, can be directed to the probe head's moving direction.

According to the invention, advantageously, the coordinate measuring machine can comprise a display adapted to show the range image. In particular, this display can be formed as a touch screen display. In this case, the controller can be adapted to control the drive mechanism on the basis of touch commands given by a user. Thereby, an intervention of a human user operating the coordinate measuring machine into the process flow executed by the controller is possible. For instance, it might be necessary to change a movement path of the probe head, to measure a measurement point not determined in advance, etc.

Also it can be advantageous to overlay the range image with a real image of the object to be measured in order to facilitate identification of certain measurement points by the user.

Furthermore, it can be advantageous if the range camera provides a stream image (range image stream), and the controller can be adapted to control the drive mechanism on the basis of the range image stream.

It can be even more advantageous, if the probe head's 3D-position is determined in a range image and the controller controls the drive mechanism on the basis of the probe head's determined 3D-position.

For instance, if the 3D-position of the probe head gets close to a 3D-position of one of the measurement points of the object to be measured, the controller may cause the drive mechanism to reduce the speed. Furthermore, such a determination can be made on the basis of the brightness value of the pixel representing the probe head and the pixels representing the object to be measured. That is, if the difference between the brightness values gets below a certain threshold value, the controller can cause the drive mechanism to reduce the movement speed of the probe head.

Advantageously, a second range camera can be provided in order to take a range image of the object's side, which is not facing to the first range camera. In this case, in order to perform the measurement of the coordinates, the controller may use 3D-data from any of the range images depending on the position and moving direction of the probe head.

The range images can be used to identify the position and orientation of the object to be measured and thus enable the probe head to be driven to the object without delay.

The range camera can also be used in case that there is no CAD model of the object to be measured available, or to roughly compare an existing CAD model with the appearance of the object to be measured.

In the first case the range picture of the object to be measured enables a rough guidance of the probe head, thus accelerating the measuring process.

In the latter case the pictures taken by the range camera can be used to identify whether the object to be measured matches a selected CAD model or even to autonomously select a CAD model out of a given set of CAD models. Also, the pictures can be used to identify major deviations of the object to be measured from the CAD model before measuring.

Advantageously, the coordinate measuring machine may comprise a calibration means which can be made visible on a range image. By using such a calibration means, for instance a plurality of geometrical reference objects positioned in a known distance, improvement of the 3D-position's accuracy can be achieved.

For instance, plural pyramids positioned on the base can be used as reference objects for the calibration means. Since their positional relation (e.g. for horizontal and vertical distances of their apexes) is exactly known, in the range image this information can be used for verifying and more accurately determining the 3D-positions of the measurement points of the objects to be measured.

Still referring to the first aspect of the invention, the coordinate measuring machine—according to a specific embodiment—comprises the controller adapted for execution of a measuring mode for precisely determining the at least one spatial coordinate of the object to be measured. On execution of the measuring mode the probe head is guided relatively to the object on a predefined measurement path and the at least one spatial coordinate of the measurement point of the object is derived from a measurement to the measurement point. Moreover, the controller is adapted for execution of an object-determination functionality, on execution of which surface data related to a surface of a body inside the measuring volume is derived from at least the first image by image processing as the image data and controlling information is derived depending on the surface data for controlling the guidance of the probe head. The object-determination functionality is executed in advance of the measuring mode and the controlling information is provided for execution of the measuring mode.

With such functionalities, a faster recognition or identification of an object on the CMM is provided and, furthermore, data is derived for performing a measurement of spatial coordinates of the detected object. A new part program may automatically be generated and executed for measuring main features without any programming task for a user. Advantageously, enabled by the object-determination functionality according to the invention, more safety for the user by avoiding collisions is provided, better reliability of the measurements (are parts correctly fixed and/or correctly aligned?) is given, very fast measurement (e.g. vision measure of a lot of holes) is enabled, the use of the CMM is simplified (no need to select the correct part program, no need to write a part program), the user may be guided to solve a problem (e.g. if the part is missing or if the part is not correctly mounted or aligned) and pallet measurements can be simplified.

According to a specific embodiment of the invention, on execution of the object-determination functionality an actual position and/or an actual orientation of the object located in the measuring volume is determined on basis of the surface data, the actual position and/or actual orientation is compared with a given demanded position and/or a given demanded orientation for the object in the measuring volume and the controlling information is generated depending on the comparison.

Furthermore, according to the invention, the object-determination functionality comprises a step of error detection, wherein the derived surface data is analysed on basis of known measuring volume properties and a presence of the object to be measured or of an obstacle is checked and output information is generated depending on the check, in particular wherein the controlling information is generated depending on the presence.

Advantageously, considering the presence or position and orientation of the object on the coordinate measuring machine, a path for measuring the object may be determined without need of further user input and, thus, user friendliness is improved. The user may be provided with sufficient information to align the part to avoid usual manual aligning steps. Additionally, the execution of the measuring mode may be made dependent on the check if the object is located on the CMM or not. Thus, these features enable to ensure that a part to be measured is on the table and is correctly fixed e.g. with a designated span tools.

Some embodiments of the invention relate to a defined (and provided) set of object data. The defined object data provides surface profiles of defined objects to be measured and/or a particular measurement path for each of the defined objects to be measured, in particular two or more measurement paths each accounting to a type of measurement sensor the object is measurable with, and/or the demanded position and/or the demanded orientation on the base corresponding to the object to be measured.

In particular, according to the invention, the object-determination functionality comprises a step of identifying the object located in the measuring volume by comparing the surface data with the set of object data, in particular wherein the controlling information is generated providing the measurement path for the identified object as a function of a particular set of object data which corresponds to the identified object.

Thus, a above comparison of given object data with derived data from a captured image of the measuring volume or the object, respectively, provides object-identification and generation of controlling information for providing precise and fast measuring of the object. A part program can be identified, which is stored and provided, that is to be used for measurement of a respective part (auto-detection of the part to be measured).

Moreover, as to a further embodiment of the invention, on execution of the object-determination functionality the camera is realigned depending on the controlling information, a second or more images are captured, the surface data is updated by additionally using data derived by image processing of the second or more images and the controlling information is actualised depending on the updated surface data. By realigning the camera, additional images from different directions are capturable and further object-surface-information is derivable from the additionally captured images for providing an improved base for measurement and/or guidance of the probe head.

Furthermore, according to a specific embodiment of the invention in context with the object-determination functionality, the camera is built as a non-range-measuring camera and/or the camera is built as a camera for capturing visually perceivable 2D-images, in particular as CCD or CMOS-Array or webcam. Relating to the object-determination functionality the used camera may be built as common camera enabled to capture images, which provide spectral information of a captured environment corresponding to human visual perceivability. Particularly, the camera comprises integrated illumination means for illuminating the measuring volume and/or the object.

Advantageously, a digital model of the object is generated—according to the invention—on basis of the image data, in particular on basis of the surface data or the 3D-positions of the target points, in particular a CAD-model. By producing such a model out of the captured at least one image a coarse shape of the object's surface can be derived and based on the shape a measuring path can be determined corresponding to which a subsequent measurement may be performed. Moreover, above mentioned advantageous features, e.g. check for presence of the object, check alignment of the object, provide a part program for measuring the object and/or find a given part program, are performable on basis of the digital model.

Particularly, as to a further embodiment of the invention, the frame structure comprises at least a first and a second frame member and a vertical rod, wherein the first and the second frame member and the vertical rod are arranged for being moveable in at least two perpendicular directions by at least two drive mechanisms, in particular wherein the coordinate measuring machine is built as portal coordinate measuring machine. Such design of a CMM additionally is described in more detail below (particularly in context with FIGS. 1, 4, 5 and 6).

Alternatively, the frame structure may provide a structure of a so called Delta Robot or of other parallel kinematics.

A Delta Robot is a type of parallel robot. It comprises a stationary platform fixed at a stationary frame, which is mounted above a workspace (above the base), and three middle jointed arms extending from the platform. The arms, often called kinematic chains, are connected with their first end to the platform by means of universal joints and connected with their second end to an end effector often built in form of a triangular or circular second platform. The arms are made of lightweight composite material and are driven by actuators (drive mechanism) located in the platform. Actuation can be done with linear or rotational actuators. As the arms are made of a light composite material the moving parts of the delta robot have a small inertia. This allows for very high accelerations and very fast movement, which outclasses by far those realizable by a portal machine or an articulated arm. The key design feature of a Delta Robot is the use of parallelograms in the arms, which maintains the orientation of the end effector by restricting the movement of the end effector to pure translation (movement only with 3 degrees of freedom (3DOF: translation in the x-, y- or z-direction). The movement of the end effector is controlled by a main controller getting feedback information of the actuators and of angle encoders connected to the joints of the arms often named position encoders. A trajectory of the end effector from a first position to a second position may be stored in the main controller. During operation the main controller controls the actuators of the arms in a way that the end effector follows the programmed trajectory.

In a further development the degree of freedom (DOF) of the Delta Robot had been extended up to 6, allowing the end effector lateral movements in Cartesian directions x, y, z and rotational movements around those axis resulting in yawing, rolling, pitching.

Nowadays, Delta Robot machines have been designed for measurement applications. Concerning such systems, a probe head with a measuring sensor (tactile or optical) is located at the end effector and the exact position of the end effector is monitored for determining exact position information for a measured point (as exemplarily disclosed in European Patent Application No. 12183806.4 filed on 11 Sep. 2012 by applicant of the present application).

SUMMARY

According to the invention, the first camera or an additional camera may be provided on the frame structure or at the probe head, in particular on the first or second frame member, and/or the camera is adapted to be directed to the base, in particular wherein additional images and additional image data are provided by the additional camera. Thus, good movability and alignment of the respective camera is provided.

In particular, relating to the first aspect of the invention, the first or the additional camera, in particular the one or more additional camera, is alignable by position variation of at least one of the frame members and/or by variation of a capturing direction of the camera, in particular by swivelling a camera objective relative to a camera base.

According to a specific embodiment of the invention, the frame structure and/or the probe head comprises at least one receptacle for carrying at least the first camera, wherein the at least one receptacle and the first camera are built so that the first camera is modularly linkable to the at least one receptacle and modularly releasable from the at least one receptacle.

Particularly, according to the invention, the coordinate measuring machine comprises a tool-exchange unit adapted for carrying the first camera and/or a measuring sensor, wherein at least the first camera and/or the measuring sensor is modularly mountable at the tool-exchange unit and/or automatically displaceable from the at least one receptacle to the tool-exchange unit and vice versa, particularly depending on measurement requirements derived from the image data.

Moreover, according to a specific embodiment of the invention, the controller is adapted to set up a movement path of the probe head on the basis of the image data and/or to control the movement path of the probe head via the drive mechanism on the basis of the image data, in particular wherein the movement path represents the measurement path.

According to a second aspect of the invention, it is also possible to take three-dimensional range images of a user of the coordinate measuring machine. For this aspect of the invention it is not necessary that—as described above—range cameras of the coordinate measuring machine take range images of an object to be measured. A combination of the two aspects would be advantageous, though.

If there are range cameras to take range images of an object to be measured as described above, one of the existing range cameras can be used to take range images of the user. For example, one of the range cameras can be adapted to store the range image data of the object to be measured in a memory and then to be directed to the user of the coordinate measuring machine to take a sequence of user range images. Based on the changes of a current user range image to one or more of preceding user range images the controller may control the drive mechanism.

According to the second aspect of the invention, it is possible for a user to control the movement and operation of the coordinate measuring machine by moving one or more of his extremities in a certain manner. Due to the changes of the range images taken of the user (user range images), for instance the controller determines a direction the user is pointing to, and makes the probe head of the coordinate measuring machine to perform a corresponding movement.

Certain movements of the user can be defined in advance to correspond to a certain action to be performed, such as resetting the coordinate measuring machine, ending or restarting the measuring process, adding an additional measurement point, skipping pre-selected measurement points etc.

Advantageously, merely a predetermined zone in a range image corresponding to a predetermined space in the user area being defined as a control zone is used for controlling the coordinate measuring machine. In this case, the user has to perform his activities in a predetermined space. Otherwise his commands will be ignored by the controller.

Advantageously, predetermined sequences of changes corresponding to predetermined movements of the user can be stored in a map. In this case, the controller controls the drive mechanism and/or one or more of the range cameras to perform a corresponding action assigned to the respective sequence of changes. Thus, by giving simple commands, the user can make the coordinate measuring machine to even perform complicated actions such as movements of the probe head taking of new range images, changing a measurement path, etc.

Advantageously, a RIM camera is combined with a 3D-display, thus creating a "3D-touchscreen". The 3D-display for instance could be a virtual reality (VR) that the user watches on a head-mounted display, such as VR-goggles, or a three-dimensional projection, for instance a hologram, wherein the scene is displayed, in which an object is to be measured. A point cloud and/or other data of the object to be measured can be provided to the user on the 3D-touchscreen.

The user then for example on the 3D-touchscreen could choose objects or points to be measured by the coordinate measuring machine by tipping his finger onto the representation of an object or a specific point on the object's surface.

A range image measuring of the object is not required for this aspect of the invention. The representation of the object can as well be provided by previously stored CAD data or images that have been taken by other means than a range camera.

BRIEF DESCRIPTION OF THE DRAWINGS

The invention in the following will be described in detail by referring to exemplary embodiments that are accompanied by figures, in which:

FIG. 8 is a schematic view of a setup of a coordinate measuring machine according to a second preferred embodiment of the invention;

FIGS. 9a and 9b are schematic range pictures of a user controlling the coordinate measuring machine of FIG. 4;

DETAILED DESCRIPTION

Figure 1:
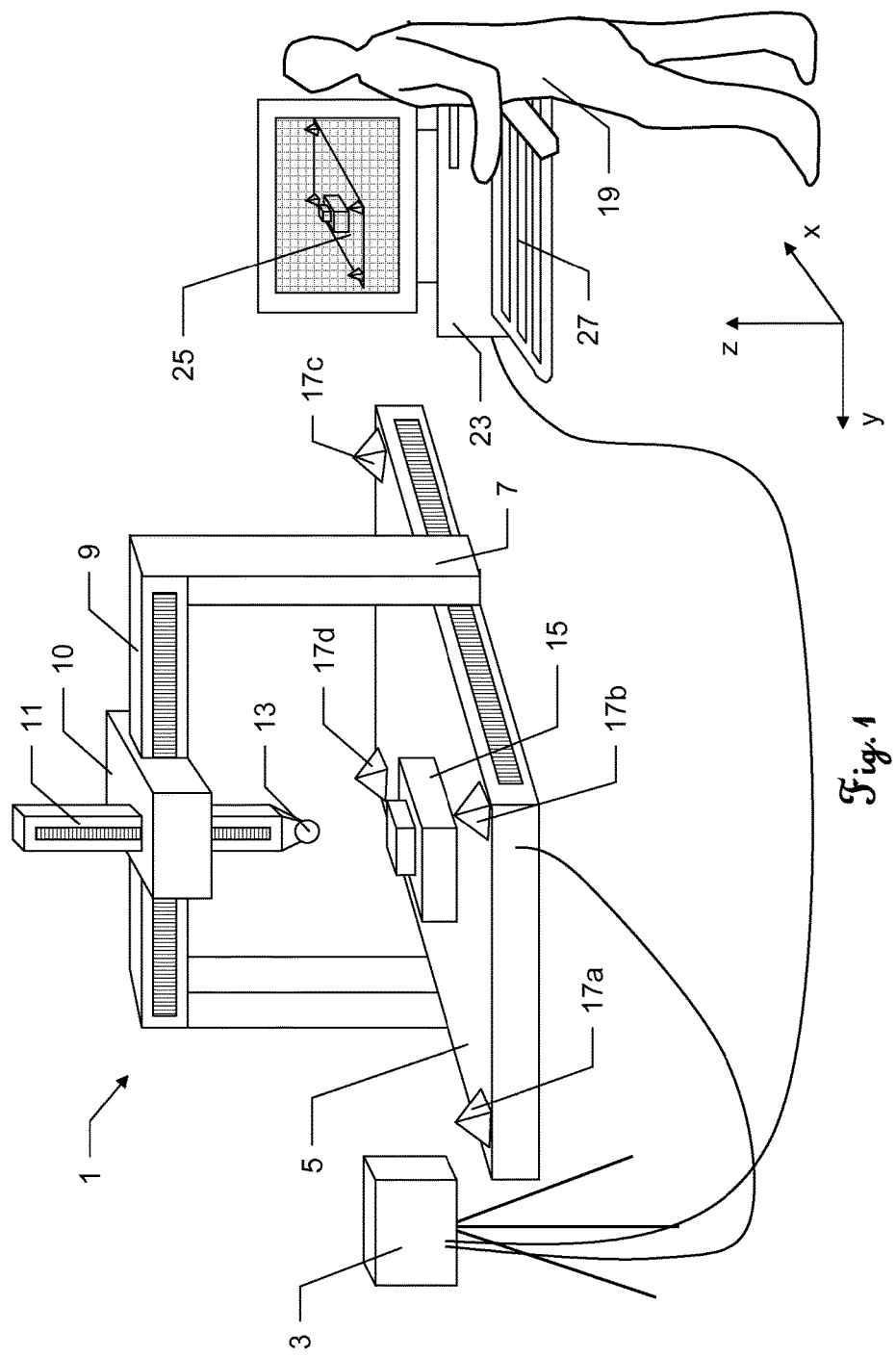
FIG. 1 is a schematic view of a coordinate measuring machine according to the invention.

A first embodiment of the invention will be described on the basis of FIGS. 1 to 7. FIG. 1 shows a schematic view of a coordinate measuring machine 1. The main components of this coordinate measuring machine 1 are a base 5, a frame consisting of a U-shaped member 7 capable to move in the horizontal direction X, and a range camera 3.

Driven by a drive mechanism (not shown), the frame member 7 is capable to move along the longitudinal sides of the base 5. This direction corresponds to a first direction X. The movement of the frame member 7 is performed by a gear rack attached to the base, which is meshing with a pinion on the frame member 7. A second frame member 10 is movably arranged on a bridging portion 9 of the frame member 7. The movement of the second frame member 10 is also achieved by a rack and pinion. A vertical rod 11 is movably incorporated into the second frame member 10. At the bottom portion of the vertical rod 11 a probe head 13 is provided. The vertical rod 11 is also movable via rack and pinion. Thus, the probe head 13 is movable to any desired point in a work zone of the coordinate measuring machine 1. It is to be noted that a drive mechanism and a controller for driving the racks and pinions, and, thus, for driving the probe head 13 is not shown.

Furthermore, at positions close to four corners of the base 5, calibration objects having the shapes of small pyramids 17a, 17b, 17c, 17d are attached to the base 5.

An object 15 to be measured is positioned in a central area of the base 5. A range image camera (RIM-camera) 3 is arranged such that it can take a range image of the base 5, the object 15 to be measured and the probe head 13.

A housing 23 accommodating a control unit serving as controller and memories such as a RAM and a ROM is connected to the RIM camera 3 and the coordinate measuring machine 1 via lines or wireless. Furthermore, a touch screen display 25 and a keyboard 27 are provided at the housing. On the touch screen display 25 a range image of the coordinate measuring machine and in particular of the object 15 to be measured is displayed. Preferably, the range image can be overlaid by a real image in order to facilitate assigning the range image to the object 15 to be measured and determining of certain measurement points by a user 19.

Figure 2:
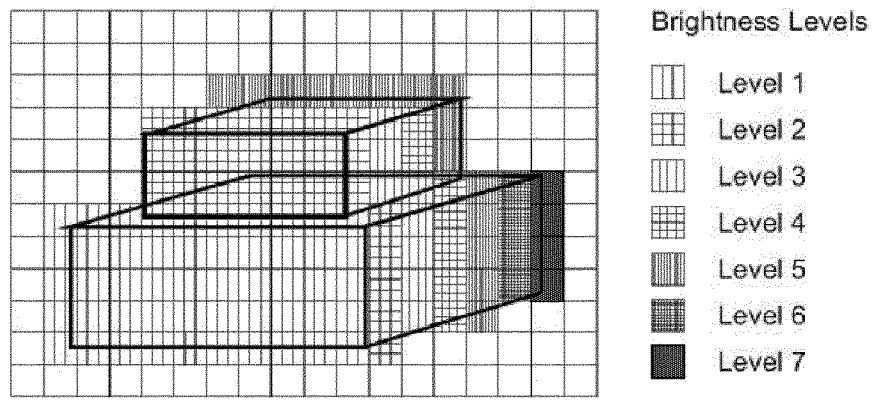
FIG. 2 is a schematic range image of an object to be measured taken by a range camera of a coordinate measuring machine according to the invention for explaining the principle of range imaging.

FIG. 2 shows a range image of the object to be measured as an example to understand the principle of the range imaging technique. In the range image all object points having the same distance from the RIM-camera have the same degree of brightness. In the example, seven brightness levels are defined. While brightness level 1 means that the corresponding RIM-pixels are assigned to object points being closest to the RIM-camera 3, brightness level 7 means that the corresponding object points are most distanced from the RIM-camera 3. Thus, since the horizontal and vertical position of each pixel is known, in combination with the brightness value corresponding to a certain distance, an accurate 3D-position of each respective object point can be determined.

It is to be noted that in FIG. 2 the object to be measured is also shown in an overlaid manner. This however, is not unambiguously necessary, but can be done in order to facilitate analyzing the range image by the user 19. Furthermore, in FIG. 2 the white fields correspond to pixels for which no data are available. That is, there are no object points available to be assigned to the respective pixels.

Figure 3:
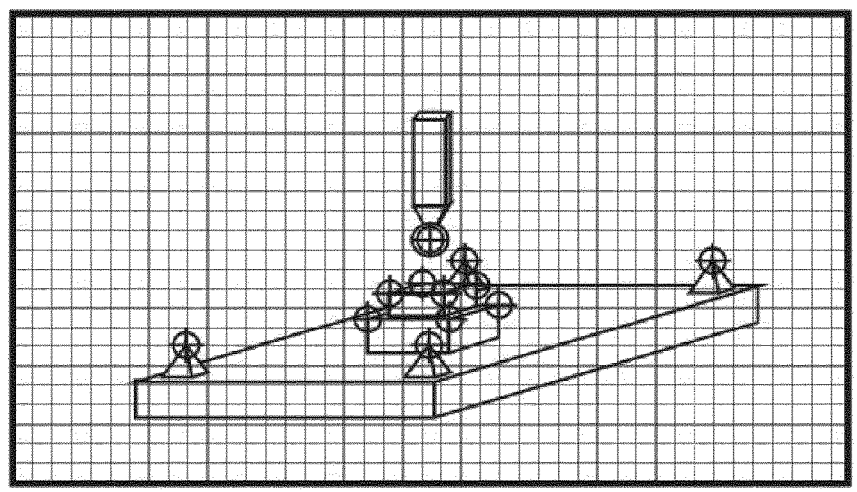
FIG. 3 is a schematic range image of an object to be measured taken by a range camera of a coordinate measuring machine according to the invention, in which 3D-positions of chosen target points have been determined and the respective target points are marked by crosshairs.

FIG. 3 is a schematic range image of the essential components of the coordinate measuring machine 1 having the object 15 positioned on its base 5. In FIG. 3 the measurement points the 3D-positions of which have been determined by the RIM-technology are marked with encircled cross-hairs. Thus, in FIG. 3 instead of different brightness levels, the pixels corresponding to chosen measurement points, the 3D-positions of which have been determined, show encircled crosshairs. Furthermore, to facilitate analyzing the range image, it is overlaid with a real image.

When performing the measuring, the RIM-camera takes a sequence of range images of the object 15 to be measured. In order to calibrate the coordinate measuring machine, in a first step the probe head 13 is subsequently moved to the tips of the four pyramids 17a to 17d. Since their spatial positions are exactly known, the quality of the measurement results can be judged. If necessary, a calibration of the coordinate measuring machine can then be performed.

Apart from the calibration of the coordinate measuring machine, it is also possible to calibrate the 3D-positions in the range image by comparing the 3D-positions of one or more of the tips of the pyramids 17a to 17d with the 3D-positions estimated from the range image. After these calibration processes have been performed, the probe head 13 is subsequently moved to the measurement points of the object 15.

While the probe head 13 in general is moved with a comparably high speed, its speed is decreased when the probe head 13 approaches the object 15, that is, when a distance between the 3D-position of the probe head 13 which is known from the current range image and the 3D-position of the subsequent measurement point becomes lower than a predetermined threshold value. In this case, a drive mechanism controller makes the drive mechanism to reduce the movement speed of the probe head 13. The determination of the probe head's distance is either done by calculating the distance between the 3D-positions of the probe head and the close object point(s) or by comparing the brightness levels of the pixel of the range image corresponding to the probe head 13 and the images of the range image corresponding to the close object point(s).

After the measurement of the respective measurement point has been completed, the probe head 13 is moved to a subsequent measurement point. Thereby, a movement path is calculated in such a manner, that the distance between the probe head 13 and the shape of the object 15 does not get below a predetermined threshold value. In particular, the movement path is calculated such that the probe head 13 is any time sufficiently distanced from the object 15. Thus, the probe head 13 can be moved near the subsequent measurement point with the maximum possible speed. Then, the controller causes a speed reduction of the drive mechanism for the probe head 13 to slowly approach the subsequent measurement point.

After all measurement points have been measured and the respective data have been stored in a memory, the object 15 can be replaced by another object 15 and the measurement of this new object 15 can be started. In general, in this case a new calibration is not required. However, another calibration can be performed, if this is necessary.

In order to enable a user to intervene into the measuring process, the range image is displayed on the touch screen display 23. Thus, various control measures can be taken by the user 19 touching the touch screen. For instance it is possible to assign additional measurement points or to change the movement path of the probe head. Additionally, the user 19 can give control commands via the key board 25 or other input means (not shown) in order to intervene with the measuring process, if this is required.

Figure 4:
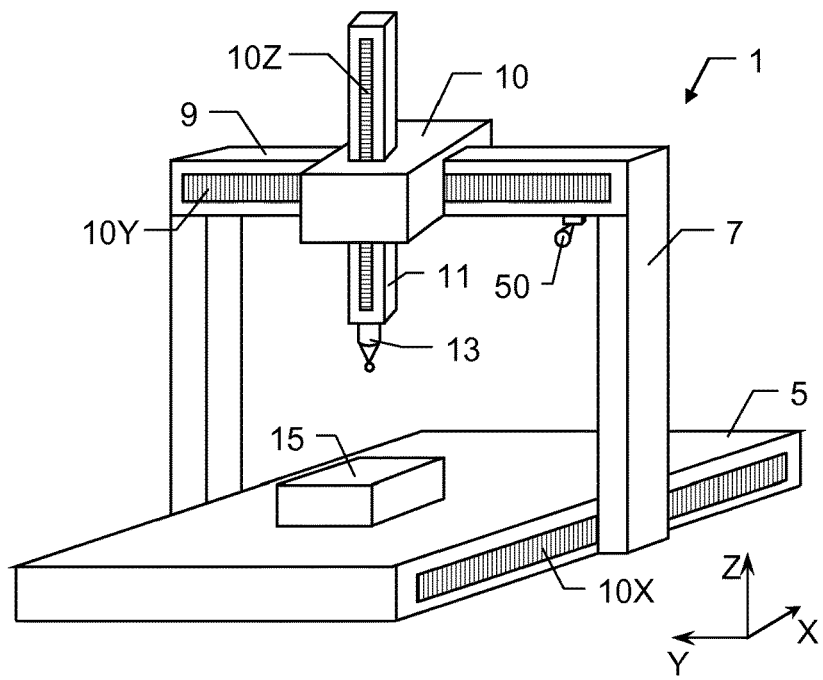
FIG. 4 depicts a further exemplary embodiment of a portal coordinate measuring machine (CMM) according to the invention.

FIG. 4 depicts a further exemplary embodiment of a portal coordinate measuring machine 1 (CMM) according to the invention, the coordinate measuring machine 1 comprising a base 5 and a frame structure for linking a probe head 13 to the base 5, the frame structure comprising several frame components 7, 9-11 being movable with respect to another. The first frame component 7 is a portal having two portal legs, which are connected by a bridging portion 9 at their upper ends. Driven by a drive mechanism (not shown), the frame component 7 is capable to move along the longitudinal sides of the base 5. This direction corresponds to a first direction X. The movement of the frame component 7 is performed by a gear rack attached to the base 5, which is meshing with a pinion on the frame component 7.

A second frame component 10 (carriage) is movably arranged on the bridging portion 9 of the frame. The movement of the second frame component 10 is also achieved by a rack and pinion. A vertical rod 11 (sleeve), building a third frame component, is movably incorporated into the second frame component 10. At the bottom portion of the vertical rod 11 a probe head 13 is provided. The vertical rod 11 is also movable via rack and pinion.

Thus, the probe head 13 is movable to any desired point in a measuring volume (work zone) of the coordinate measuring machine 1 in the directions X, Y and Z. The measuring volume is defined by the base 5 and the frame components 7,9,11. The three space directions X, Y and Z are preferably orthogonal to one another, although this is not necessary for the present invention. It should be noted that a drive mechanism and a controller for driving the racks and pinions, and, thus, for driving the probe head 13 is not shown.

An object 15 to be measured is positioned in the space of the measuring volume on the base 5.

The probe head 13, on which a stylus is arranged exemplarily, is fastened on the lower free end of the rod 11. The stylus is used in a manner known per se for touching the object 15 to be measured. However, the present invention is not restricted to a tactile coordinate measuring machine and may likewise be used for coordinate measuring machines in which a measurement point is approached in a non-contact manner, i.e. for example a coordinate measuring machine with an optical scanning head. More generally, the probe head 13 may be designed for arranging a contact probe, e.g. a scanning or touch trigger probe, or a non-contact probe, particularly an optical, capacitance or inductance probe.

Two of the most common types of bearings between the movable members and the guides are air bearings or mechanical bearings (e.g. linear circulating plus rails). The air bearings give the advantage that there is no friction in the movement (which may introduce different kind of errors like angle errors or hysteresis). The disadvantage of air bearings is that the stiffness is lower than in mechanical bearings, so that particularly dynamic errors may occur. In mechanical types, the stiffness in the bearing system is typically higher but there is friction and the friction forces may introduce errors. However, the invention may be applied for both types of bearings.

Summed up, the coordinate measuring machine 1 is built for determination of three space coordinates of a measurement point on an object 15 to be measured and, therefore, comprises three linear drive mechanisms for provision of movability of the probe head 13 relative to the base 5 in the first, second and third direction (X, Y and Z direction).

Each linear drive mechanism has a linear guide, one in the first, one in the second and one in the third direction (X, Y and Z direction), respectively. In a simple embodiment, the linear guide of the X-direction drive mechanism is formed by two edge-building surfaces of the base 5, the linear guide of the Y-direction drive mechanism is formed by two or three surfaces of the bridge and the linear guide of the Z-direction drive mechanism is formed by a cubical hole in the Y-carriage member 10.

Furthermore, each linear drive mechanism comprises a movable member being supported for movement along the guide by bearings. In particular, the movable member of the X-direction drive mechanism is embodied as X-carriage having mutually facing surfaces with respect to the above mentioned two guiding surfaces of the base 5. The movable member of the Y-direction drive mechanism is embodied as Y-carriage having mutually facing surfaces with respect to the above mentioned two or three guiding surfaces of the bridge. And, the movable member of the Z-direction drive mechanism is formed by Z-column 11 (sleeve) having mutually facing surfaces with respect to the inner surfaces of the cubical hole in the Y-carriage 10.

Moreover, each linear drive mechanism comprises a linear measuring instrument for determination of a first, a second or a third drive position, respectively, of each movable member in the first, the second or the third direction (X, Y and Z direction), respectively.

In this exemplary embodiment of FIG. 4, the portal legs 7 each have a movable X-carriage which allows movement of the first frame component in X-direction.

A measuring scale 10X being part of the X-measuring instrument is schematically represented on the long side of the base 5, wherein the scale 10X extends parallel to the X-direction. The scale may be a glass measuring scale, e.g. having incremental or absolute coding, with which a drive position in the X-direction of the X-carriage can be determined. It is to be understood that the measuring instrument may furthermore contain suitable sensors for reading the measuring scale 10X, although for the sake of simplicity these are not represented here. However, it should be pointed out that the invention is not restricted to the use of glass measuring scales, and therefore may also be used with other measuring instruments for recording the drive/travelling-positions of the movable members of the drive mechanisms.

Another measuring scale 10Y is arranged parallel to the Y-direction on the bridging portion 9 of the frame. Finally, another measuring scale 10Z is also arranged parallel to the Z-direction on the Z-ram 11. By means of the measuring scales 10Y,10Z as part of the linear measuring instruments, it is possible to record the present drive positions of the carriage 10 in Y-direction and of the sleeve 11 in the Z-direction metrologically in a manner which is known per se.

Not shown is a controlling and processing unit, which is designed to actuate the motor drives of the coordinate measuring machine 1 so that the probe head 13 travels to the measurement point. The controlling and processing unit comprises a processor and a memory. In particular, the controlling and processing unit is designed for determining the three space-coordinates of the measurement point on the object 15 as a function of at least the first, the second and the third drive position of the three drive mechanisms.

For manual operation, the control unit may be connected to a user console. It is also possible for the control unit to fully automatically approach and measure measurement points of the object 15 to be measured.

Because the design of coordinate measuring machines of the generic kind as well as the design of different linear guides and different linear measuring instruments are well known to skilled persons, it must be understood that numerous modifications and combinations of different features can be made. All of these modifications lie within the scope of the invention.

Moreover, the coordinate measuring machine 1 comprises a camera 50, in particular being built as a non-range-measuring CCD camera, for capturing images of the measuring volume.

The camera 50 is arranged on the frame component 12 and, therefore, being positionable by moving the frame component 9 along the X-axis. According to the present embodiment, the camera comprises a camera base and a camera objective, the objective being swiveable relatively to the camera base and, thus, providing additional alignment axis. However, the present invention is not restricted to the use of cameras being enabled for aligning their capturing directions and may likewise be used with other camera types for capturing images according to their arrangement at the CMM.

According to the invention, the measuring volume is at least partly captured and analysed before (precisely) measuring the object 15 with use of the camera 50 in order to e.g. check if the object 15 to be measured is placed on the base 5, if the detected object 15 is of the type of demanded objects, if the object 15 is located and positioned correctly and e.g. for determining a measuring path for measuring the object 15 with the measuring sensor at the probe head 13.

For providing these features the camera 50 is aligned so that at least a first image of at least a first part of the measuring volume is capturable by the camera 50 and the at least first image is captured then. Surface data is derived from the at least first image by image processing, wherein the surface data represents a surface profile according to a content of the at least first part of the measuring volume. On basis of the gathered surface data controlling information is generated. Such controlling information is then provided for a subsequent execution of the precise measurement of the object.

As the camera 50 is moveable along the X-axis and is alignabel according to its pivotability, additional images of the measuring volume, e.g. of additional parts of the measuring volume, may be captured and considered for deriving the surface data of the object.

Above describe functionality may provide an improved user-friendliness for coordinate measuring machines as with starting the functionality an automated scan of the measuring volume may be performed and the object 15 on the base 5 may be determined (checking for the presence of the object 15, respectively). Furthermore, a measuring program for measuring the object 15 may be chosen or generated and the object 15 is measured automatically.

Figure 5:
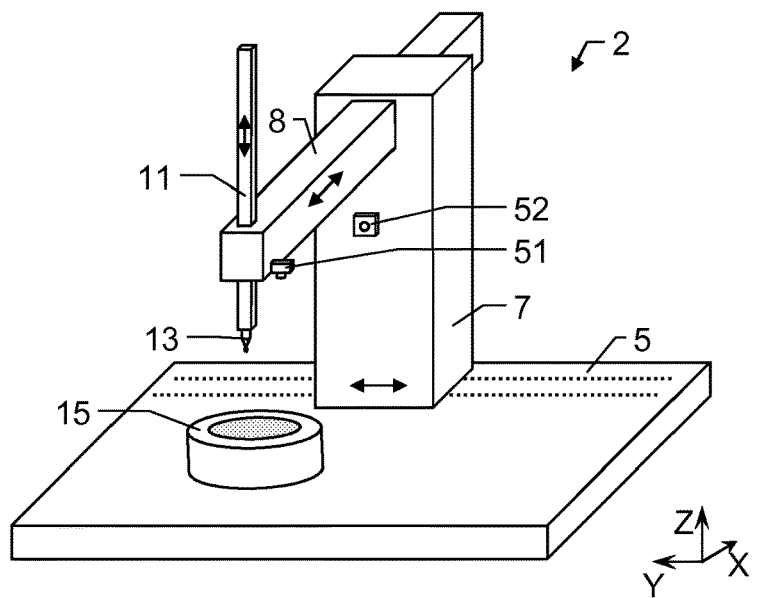
FIG. 5 shows a further exemplary embodiment of a coordinate measuring machine (CMM) according to the invention.

FIG. 5 shows a further exemplary embodiment of a coordinate measuring machine 2 (CMM) according to the invention, the coordinate measuring machine 2 comprising a base 5 and the frame components 7,8,11 for providing movability of the probe head 13 in three directions (X-, Y- and Z-direction) relative to the base 5. Furthermore, the frame components 7,8,11 are moveable relative to each other by drive mechanisms (not shown) linking the three frame components 7,8,11 and the base 5.

An object 15 to be measured is placed on the base 5. For measuring this object 15 the probe head 13 is approached to the surface of the object 15. Coordinates are determined according to a predefined measuring path on which a tactile measuring sensor at the probe head 13 is guided and the surface profile of the object is determined depending on that measurement.

According to the invention, in advance of determining the surface of the object 15, an object determination functionality is executed using the cameras 51,52 arranged at the frame structure of the coordinate measuring machine 2. The cameras 51,52 may be built as simple overview cameras, e.g. webcams, moveable by moving respective frame components 7,8 the cameras 51,52 are arranged at.

In context of the object determination functionality at least one image is captured with each camera 51,52 and, thus, at least an partly overview of the working zone and the object 15 is provided. In case the images do only show a part of the measuring zone the object is not laying inside, the cameras are relocated and further images are captured so that the object 15 is detectable by image processing of the captured images. Such check (if the object is captured by the images) is performed by image processing of the images, as well.

The machine 2 further comprises a memory unit on which object data is stored. After detecting the object 15 from the captured images and deriving surface data for the object 15 from the images, this data is compared to the object data stored in the memory unit and the type of object present on the base 5 is identified on basis of comparing the data.

Moreover, a measuring path accounting to the identified object type is chosen from the object data and controlling information is generated depending on the chosen measuring path, providing controlling data for measuring the surface of the object 15 by the measuring sensor at the probe head 13. The generated controlling data is then used for guiding the probe head 13 (and measuring sensor) relative to the surface of the object 15 so that the measuring points on the object 15 are detectable with a defined point-to-point resolution. Furthermore, the controlling information is generated in dependency of the measuring sensor to be used for measuring the object 15.

According to a particular embodiment, in a first phase—to simplify the image processing—reference images can be taken with the cameras 51,52 e.g. while simultaneously automatically producing a part program as to the object 15. Based on these images easily recognising of the part, using the correct part program and checking the alignment is provided.

Figure 6:
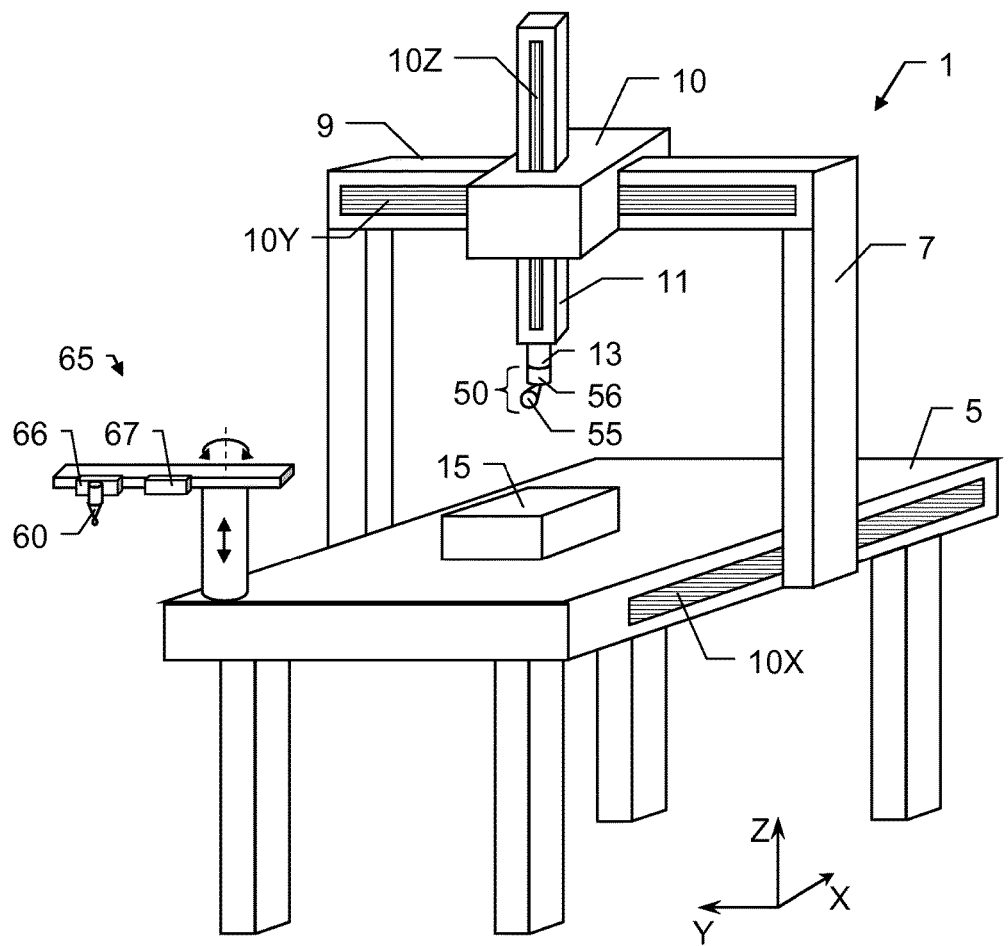
FIG. 6 shows a further exemplary embodiment of a coordinate measuring machine (CMM) according to the invention.

FIG. 6 shows a further exemplary embodiment of a coordinate measuring machine 1 (CMM) according to the invention, wherein the coordinate measuring machine 1 basically is built according to the coordinate measuring machine 1 of FIG. 1 being located on a table. An object 15 is positioned on the base 5 of the CMM 1.

The probe head 13 is carrying a camera 50, which is modularly removable arranged at the probe head 13. With use of this camera 50 at least one image of the object 15 is captured and coarse surface data corresponding to the surface of the object 15 is derived from that image by image processing. For taking the image the camera 50 is aligned by moving the frame components 7,9-11 relatively to the base 5 and in particular by swiveling camera optics 55 relatively to the camera base 56.

In order to gather surface data of the object 15 a first image may be captured representing a part of the measuring volume (working zone) and the first image is analysed on basis of known working zone properties. Depending on such analysing information is generated comprising information referring to the presence of the object 15 on the base 5, i.e. it is discovered if an object lies in space of the captured working zone or not. In case the object 15 lies inside the captured measuring region a type of object and/or a measuring path for precisely measuring the object 15 is determined.

If no object is discovered within the captured part of the working zone the camera is realigned and/or repositioned and a further image is captured then. Such realigning and/or repositioning may be repeated until the object 15 is discovered or until the whole measuring room is represented by the sum of captured images.

Moreover, several images of the object 15 may be taken from different positions and directions in order to provide a shape and/or dimensions of the object 15 to be measured. The taken images are analysed by image processing. Depending on the method to be used for measuring the object 15 the surface data derived from the images is used for directly determining a measuring path or is used for comparing the surface data with stored object data for identifying the object 15 (and the position and/or orientation of the object) and determining a corresponding measuring path based on that identification.

After a suitable measuring path for the object 15 is determined, the object 15 is precisely measured with the measuring sensor 60, which exemplarily is built as tactile sensor enabled to determine coordinates of the surface of the object 15 by contact, wherein the measuring sensor 60 is guided along the measuring path.

For providing such measuring functionality the coordinate measuring machine comprises a tool-exchange unit 65 with receptacles 66,67 adapted for at least carrying probes like the measuring sensor 60 and/or the camera 50. As indicated by the arrows at the tool-exchange unit 65, this unit 65 is designed for providing movability of the receptacles 66,67 in order to exchange working tools (e.g. sensors and cameras) at the probe head 13. Thus, the camera 50 located at the probe head 13 is removed and transferred to a free receptacle 67 of the tool-exchange unit 65 by approaching the probe head 13 to the receptacle 67 and executing an exchange mode. The measuring sensor 60 subsequently is dislocated from the receptacle 66 to the probe head 13 in vice versa manner.

By exchanging the tool at the probe head 13, a previously identified object 15 (by image processing of images taken by the camera 50) is measurable with the provided measuring sensor 60 then. The sensor 60 is guided corresponding to determined surface data of the object 15 and corresponding to the position and/or orientation of the object 15 at the CMM 1.

Providing an exchange functionality for working tools or measuring sensors, respectively, is not restricted to the exemplary embodiment of the invention according to FIG. 6. Such function may equally be provided by a stand-alone unit not arranged at the coordinate measuring machine 1. Additionally, a robotic arm may be provided for automatically mounting and demounting e.g. sensors and cameras at the probe head 13 and/or at receptacles arranged at the CMM 1 and/or at receptacles of the tool-exchange unit 65.

Furthermore, the invention is not restricted to a coordinate measuring machine as shown in FIG. 1,4,5 or 6. It may equally be used for coordinate measuring machines in gantry design, in which only the bridge with two supports, functioning as very short feet, can travel along two highly placed fixed rails. Moreover, the invention may generally be used for all types of coordinate measuring machines, i.e. for a CMM being designed as parallel kinematics machine as well as for a CMM having linear or serial kinematics. Exemplarily, the CMM may be designed in bridge-type, L-bridge-type, horizontal-arm-type, cantilever-type or gantry-type.

Figure 7:
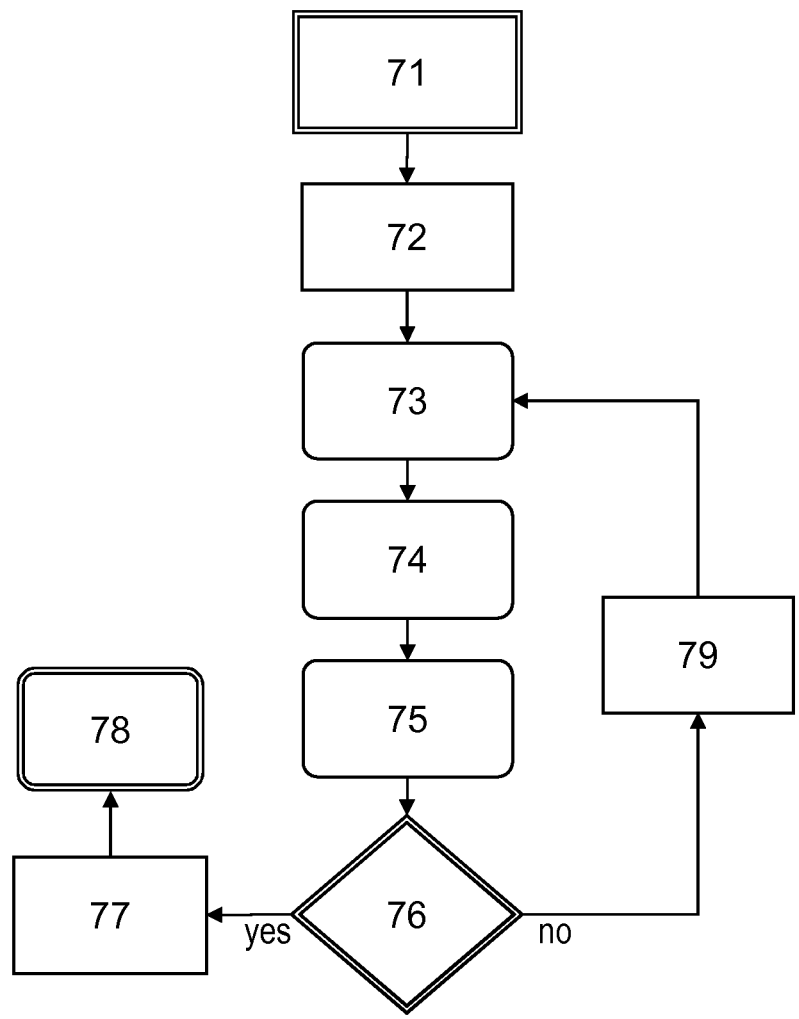
FIG. 7 is a flow chart which illustrates the use of a method for identifying an object and for measuring said object subsequently according to the invention with use of a coordinate measuring machine.

FIG. 7 shows a flow chart which illustrates the use of a method for identifying an object and for measuring said object subsequently according to the invention with use of a coordinate measuring machine. The user starts a measuring process with performing a first manual command 71, for instance by pressing a start bottom at the CMM. The successive measuring process may be performed fully- or semi-automated, i.e. the user inputs further commands into the CMM or does not. The manual command is detected by input means and starts the determination of the object 72, wherein a driving command is generated, which is transmitted to the drive mechanism of the CMM. The drive mechanism then drives the frame components of the CMM according to the driving command so that a capturing position for a camera is reached.

In context with the determination of the object 72, a first image of the measuring volume is captured 73 and surface data is derived 74 from the image by image processing. On basis of the surface data controlling information is generated 75, the controlling information comprising data and/or commands representing further processing steps depending on if an object is discovered 76 (on basis of the surface data) or if a measuring path is provided by the controlling information.

If the object is discovered and if a measuring path is derived 76 by the gathered surface data or from a memory unit providing measuring paths for known (discovered) object types, coordinate measurement of the object is initiated 77 based on the controlling information and spatial coordinated are determined 78. In order to perform such measurement a measuring sensor may be chosen (and mounted at the probe head) according to the controlling information and the measuring path may be adapted depending on the chosen sensor. Choosing the sensor may be performed automatically by the system, e.g. by maintaining demanded measuring resolution, or manually by the user. The user may be enabled either to chose a sensor type or a resolution to be reached and choosing a suitable sensor based on the demanded resolution.

If no object is discovered or e.g. if the measuring path is derived ambiguously by capturing the first image 73 and processing first image information 74, the camera for capturing the measurement volume is realigned 79 and a second (or more) image is captured 73 from a second position and direction (alternatively or additionally the resolution of the camera or cameras is changed). The surface data 74 and the controlling information 75 are updated considering the additional captured image or the more images respectively. Such additional image capturing and updating of processing information is performed either until the object is discovered (respectively identified) and/or until the whole measuring volume is captured and analysed.

As a result of this image capturing the object may be determined 78 or an output information may be generated providing information of non-discovering of the object. If the object is not discovered e.g. a resolution of the camera or the camera itself may be switched or exchanged in order to repeat the object-recognition process with higher resolution or different capturing specifications (e.g. capturing with other wavelengths sensitivity) and trying to identify the object then. Otherwise, if the object is determined, alternative output information may be generated providing e.g. orientation and/or location of the object, the type of the object, coarse structure of the object and/or information about possible obstacles in space of the measuring volume to be considered for subsequent measurement of the object. Furthermore, the measuring path may be derived on basis of this information and the object may be scanned according to the derived path.

Furthermore, the method according to FIG. 7 is not restricted to CMMs of portal type as e.g. shown in FIGS. 4-6 but may be executed in general with CMM of all known types. The method according to FIG. 7 may generally be used with machines of any mechanical structure that is enabled to gather data in a measuring volume, i.e. machines enabling movement of machine parts in at least two degrees of freedom. Such CMM may be in designed as articulated arm, parallel kinematics or a CMM or robot having linear or serial kinematics. Exemplarily, the CMM may be designed in bridge-type, L-bridge-type, horizontal-arm-type, cantilever-type, gantry-type or as Delta Robot.

According to a specific embodiment of the invention the images of the measuring volume may be captured by continuously gathering the images, in particular by recording a video stream.

Another aspect of the invention with three more embodiments will be described on the basis of FIGS. 8 to 11. In these FIGS. 8 to 11 components corresponding to that of the first embodiment are referred to by using the same reference signs. A repeated description of these elements will be omitted.

FIG. 8 is a schematic view of a setup of a coordinate measuring machine 1 according to a second embodiment of the invention. While the illustrated components of the coordinate measuring machine 1 correspond to those of the coordinate measuring machine 1 of the first embodiment, the RIM-camera 33 is of a rotatable type. That is, after taking the range image of the object 15 to be measured, and after the calibration has been performed, the RIM-camera 33 is rotated and takes a sequence of range images of a user 19 (user range images) who is positioned in a control zone 21. A controller (not shown) provided with the coordinate measuring machine 1 in the housing 23 is adapted to determine the changes of the user range images.

Thus, by moving his extremities or performing other movements, the user 19 can give commands in order to control the coordinate measuring machine. FIG. 9*a* shows an initial position of the user 19.

FIG. 9*b* shows a change in that the user 19 has lowered his left arm towards a horizontal position and has moved it backwards. Furthermore, the user 19 has moved his right arm fully downwards and forwards. Accordingly, the left hand of the user 19 is most distanced from the RIM-camera 33 and the pixels of the range image corresponding to the left hand are quite dark (brightness level 6). In contrast, the right hand of the user 19 is quite near to the RIM-camera 33 and, thus, the pixels corresponding to its left hand are quite bright (brightness level 1).

Thus, by determining the user's movements on the basis of the changes of the range images, the controller issues certain commands in order to have the coordinate measuring machine 1 perform various actions. For instance, the user can intervene into the movement path, can define additional measurement points, can perform another calibration or can quit the measurement.

In order to perform an accurate control by the user 19 and to prevent erroneously given commands, in the range image a certain section corresponding to a control zone 21 marked by a dashed line is defined. For determining the movements performed by the user 19, the user 19 must be present in this control zone and must face the RIM-camera 33. Accordingly, if the user 19 steps out of the control zone 21, although changes of the user's 19 posture might be visible in the range images, the controller will ignore the changes and, thus, the coordinate measuring machine 1 will not react upon the user's 19 commands.

Preferably, the control zone can be in the form of a small platform or depression.

In FIGS. 9*a* and 9*b*, as in FIG. 2, the white fields correspond to points falling out of the measuring scope of the RIM-camera.

Figure 10:
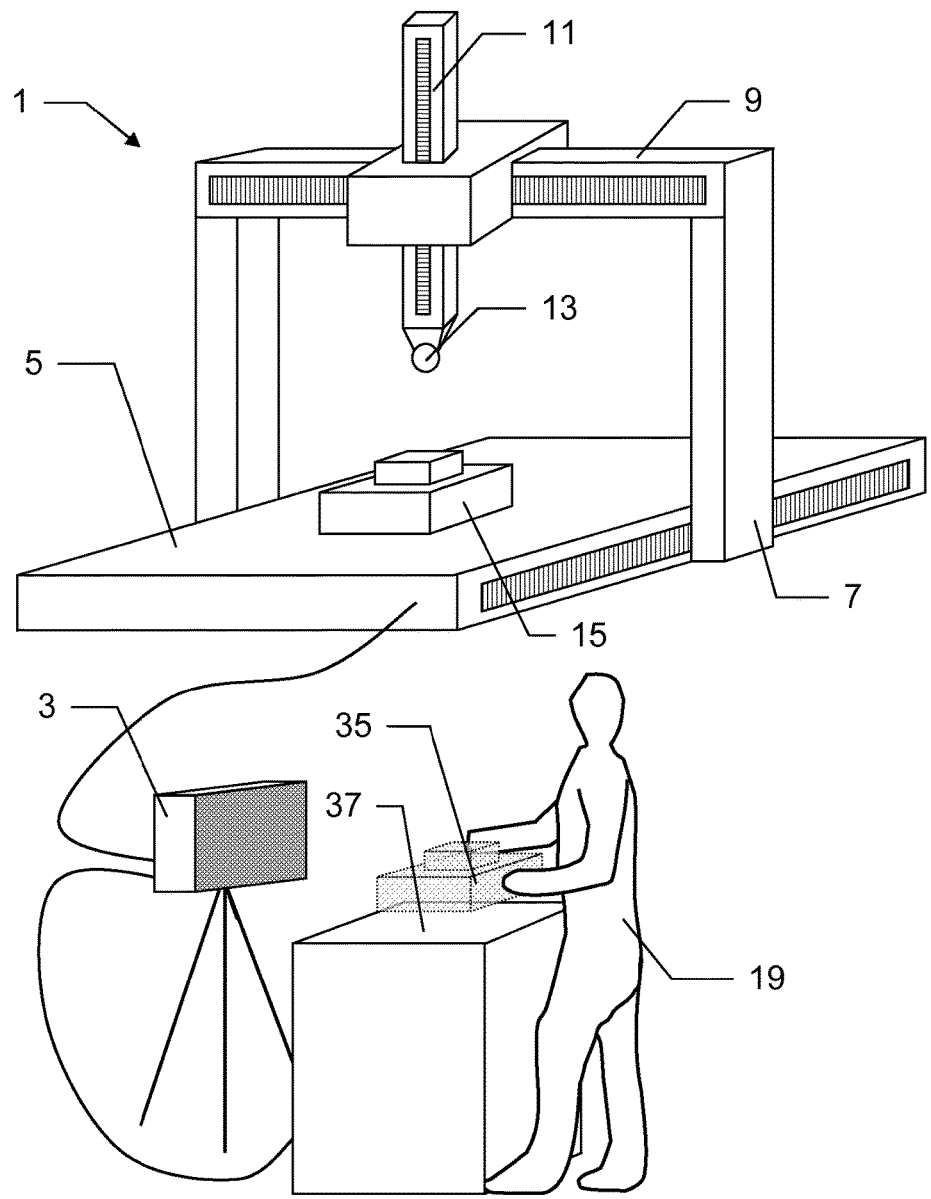
FIG. 10 is a schematic view of a setup of a coordinate measuring machine according to a third preferred embodiment of the invention.

FIG. 10 is a schematic view of a setup of a coordinate measuring machine 1 according to a third embodiment of the invention. On a three-dimensional display 37 a three-dimensional projection 35 of the object 15 to be measured is displayed. A RIM-camera 3 is connected with the coordinate measuring machine 1 and the three-dimensional display 37 and takes range images of the user 19. The connection can be wired, as shown in FIG. 10, or wireless.

In the projection 35 additional information about the object 15 and/or virtual input means for certain commands for the coordinate measuring machine 1 can be displayed to the user 19.

The user then uses the projection 35 as a 3D-touchscreen and chooses objects or points to be measured by the coordinate measuring machine 1 by tipping his finger onto the projection 35 of the object 15 or a specific point on the object's surface. The RIM-camera 3 determines the user's movements on the basis of the changes of the range images. The controller issues certain commands in order to have the coordinate measuring machine 1 perform various actions. For instance, the user 19 can intervene into the movement path, can define additional measurement points, can perform another calibration or can quit the measurement.

In order to perform an accurate control by the user 19 and to prevent erroneously given commands, in the range image a certain section is defined as a control zone. The control zone preferably comprises at least the area of the three-dimensional projection 35.

For determining the movements performed by the user 19, at least parts, in particular the hands, of the user 19 must be present in this control zone. Accordingly, if the user's hands leave the control zone, although movements of the hands might be visible in the range images, the controller will ignore the changes and, thus, the coordinate measuring machine 1 will not react upon the user's 19 commands.

Figure 11:
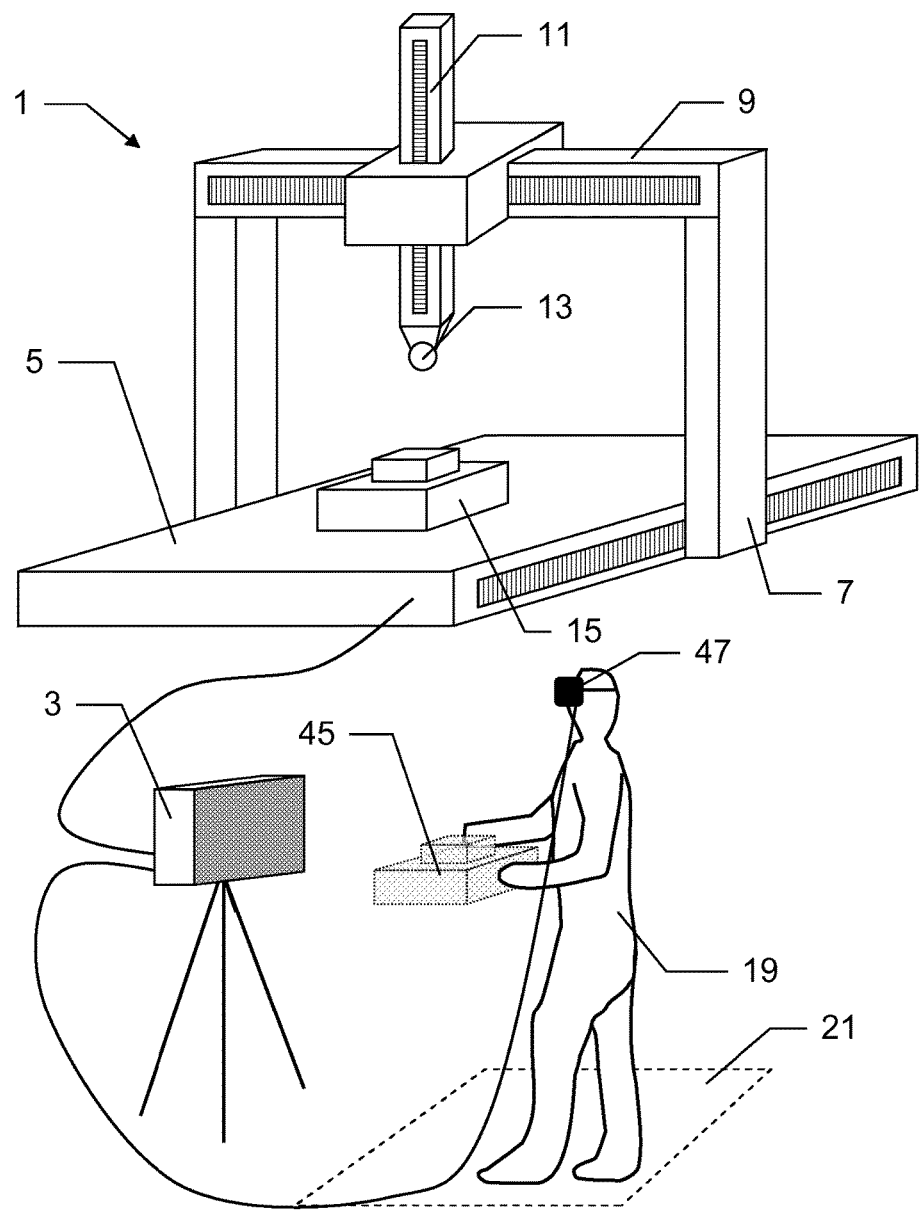
FIG. 11 is a schematic view of a setup of a coordinate measuring machine according to a second preferred embodiment of the invention.

FIG. 11 is a schematic view of a setup of a coordinate measuring machine 1 according to a fourth embodiment of the invention. The user 19 wears a pair of VR-goggles 47, which display a virtual model 45 of the object 15 to be measured. A RIM-camera 3 is connected with the coordinate measuring machine 1 and the VR-goggles 47 and takes range images of the user 19. The connection can be wired, as shown in FIG. 11, or wire-less.

Optionally, in order to perform an accurate control by the user 19 and to prevent erroneously given commands, in the range image a certain section corresponding to a control zone 21 marked by a dashed line is defined. For determining the movements performed by the user 19, the user 19 must be present in this control zone and must face the RIM-camera 33. Accordingly, if the user 19 steps out of the control zone 21, although changes of the user's 19 posture might be visible in the range images, the controller will ignore the changes and, thus, the coordinate measuring machine 1 will not react upon the user's 19 commands. Preferably, the control zone 21 can be in the form of a small platform or depression.

While the invention has been described on the basis of presently preferred embodiments, plural modifications and adaptations can be performed within the scope of the claims.

For instance, an additional RIM-camera can be provided in order to take a range image of the object's 15 to be measured side facing away from the RIM-camera 3 or 33. In this case, since two range images are available, one of the two range images can be chosen as basis for controlling the driving means. In this case, the probe head's position and movement direction will be deciding which image is used.

Alternatively, it can be possible to provide a rotatable base for taking a range image of the side not facing towards the RIM-camera. By comparing the 3D-positions of object points visible in both range images, the 3D-positions of the not any longer visible object points can be calculated with a sufficient accuracy.

Thus, an exact positioning of the object to be measured is not unambiguously necessary in this case. Here, it is possible to move the probe head also from the side not facing towards the RIM-camera without a risk of a sudden impact between the probe head and the object to be measured.

While in the described embodiments a RIM-camera is provided at a fixed position, additionally or alternatively a RIM-camera can be provided near the probe head in a manner to be movable with the probe head. Furthermore, such a camera can be rotatable in order to be directed to the probe head's moving direction at any time. Thereby it is possible to take a range image of the object from a very close distance, and in particular, to control the drive mechanism driving the probe head and the camera based on brightness value changes and differences in comparison to subsequently taken range images.

Depending on the resolution of the RIM-sensor used, it can be useful to overlay the range image with a real image of the working zone of the coordinate measuring machine or at least of the object to be measured. Furthermore, other methods such as edge extraction can be additionally used to improve the coordinate data determination and, thus, the measuring result.

While in the embodiments the drive was described as a rack and pinion combination, other drive means such as a pneumatic or a hydraulic drive or a worm gear transmission may be suitably employed as drive means.

While in the embodiments a fixed (mechanical) probe head is shown, alternatively the probe head can be of a mechanical, optical, laser, or white light type amongst others. Furthermore, the probe head can be a powered rotary device with the probe tip able to swivel vertically through 90 degrees and through a full 360 degree rotation.

In the described embodiments small pyramid shaped objects are used for calibration purpose. However, these pyramid shaped objects can be omitted. Also, other suitable calibration means or compensation means capable to compensate measuring errors of the coordinate measuring machine may be used in order to improve the accuracy of the measuring results.

While in the embodiments a connection between the housing accommodating the controller and the first RIM-camera and the coordinate measuring machine, respectively, is established by lines (wires) a communication between these elements can be established also by wireless means such as WLAN, Bluetooth, radio, infrared or others.

In the embodiments use of one or more RIM-cameras was described to generate range images from all sides of the object to be measured. After the range images have been taken and the 3D-position data have been stored, on the display the view of the image can be adapted according to the user's needs. For instance, in the range image the object can be rotated to show the object's side directed away from the user. Furthermore, apart from that this rotation movement or another adaptation of the range image can be performed on the touch screen display, these actions can be also performed on basis of the user's commands as is described in the second embodiment.

What is claimed is:

1. A coordinate measuring machine for determining at least one spatial coordinate of a measurement point of an object to be measured, comprising:
    a base,
    a frame structure comprising at least a first and a second frame member and a vertical rod, wherein the first and the second frame member and the vertical rod are arranged for being moveable in at least two perpendicular directions by at least two drive mechanisms comprising at least one motor drive, a probe head which is attached to the vertical rod of the frame structure and comprises a tactile measuring sensor, and a first range camera having a range image sensor with a sensor array, wherein the first range camera is:
provided at the probe head or in an area close to the probe head at the vertical rod,
configured to be moved synchronously with the probe head and the tactile measuring sensor, and
configured to be directed to the object in the measuring volume and to provide a first range image of the object, wherein the drive mechanisms are adapted to drive the probe head relative to the base for approaching the measurement point in a measuring volume of the coordinate measuring machine, in which measuring volume the object is positionable, so that the measuring point is detectable by the tactile measuring sensor, wherein the coordinate measuring machine comprises a controller comprising a processor and a memory, the controller being configured:
to create a point cloud with 3D-positions of the target points of the object by using range pixels from the first range image, and
to automatically control the drive mechanisms by actuating the at least one motor drive on the basis of the 3D-positions of the target points to measure the object with the tactile measuring sensor.

2. The coordinate measuring machine according to claim 1, wherein the first range camera provides a range image stream, and the controller is adapted to control the drive mechanism on the basis of the range image stream.

3. The coordinate measuring machine according to claim 1, wherein the first range camera is provided in a rotatable manner to be directed to the moving direction of the probe head.

4. The coordinate measuring machine according to claim 1, wherein the first range camera is alignable by position variation of at least one of the frame members and/or by variation of a capturing direction of the camera by swiveling a camera objective relative to a camera base.

5. The coordinate measuring machine according to claim 1, wherein the first range camera comprises integrated illumination source for illuminating the measuring volume and/or the object.

6. The coordinate measuring machine according to claim 1, wherein a second range camera is provided on the first or second frame member and is directed to the base for providing a second range image of an area of the object.

7. The coordinate measuring machine according to claim 6, the controller is adapted to use 3D-data from either of the range images, depending on a position and moving direction of the probe head.

8. A coordinate measuring machine for determining at least one spatial coordinate of a measurement point of an object to be measured, comprising:
a base,
a probe head comprising a tactile measuring sensor,
a drive mechanism comprising at least one motor drive, adapted to drive the probe head relative to the base for approaching the measurement point,
a first range camera having a range image sensor with a sensor array, wherein the range camera is adapted to be directed to a user of the coordinate measuring machine to take a sequence of user range images, and
a controller comprising a processor and a memory, wherein the controller is adapted to:
control the drive mechanism by actuating the at least one motor drive,
determine changes of a current user range image to one or more of preceding user range images,
identify, based on the changes, at least one movement of the user that corresponds to a predefined command, wherein one or more movements of the user are predefined as a command for one or more actions to be performed, and
automatically control the coordinate measuring machine on the basis of the command corresponding to the identified movement.

9. The coordinate measuring machine according to claim 8, wherein a point cloud of the object and/or CAD-data of the object are provided to the user using a virtual reality provided by VR goggles.

10. The coordinate measuring machine according to claim 8, wherein a zone in the range image corresponding to a space in the user area is defined as control zone, and the controller is adapted to ignore changes of the current range image outside of the zone.

11. The coordinate measuring machine according to claim 8, wherein predetermined sequences of changes corresponding to predetermined movements of a user are stored in a map in advance, and the controller controls the drive mechanism to perform an action assigned to the respective sequence of changes.

12. A coordinate measuring machine for determining at least one spatial coordinate of a measurement point of an object to be measured, comprising:
a base,
a probe head comprising a tactile measuring sensor,
a drive mechanism comprising at least one motor drive, adapted to drive the probe head relative to the base for approaching a measurement point,
at least a first range camera having a range image sensor with a sensor array, wherein the first range camera is adapted to be directed to the object for providing a range image of the object, and
a controller, comprising a processor and a memory, the controller being adapted to control the drive mechanism by actuating the at least one motor drive and to determine the at least one spatial coordinate by determining a drive position of the drive mechanism,
wherein the first range camera or a second range camera is adapted to be directed to a user of the coordinate measuring machine to take a sequence of user range images,
wherein the controller is adapted to:
create a point cloud with the 3D-positions of the target points of the object by using the range pixels of the range image,
determine changes of a current user range image to one or more of preceding user range images,
determine, based on the changes, at least one movement of the user that corresponds to a predefined command, wherein one or more movements of the user are predefined as a command for one or more actions to be performed, and
automatically control the drive mechanism on the basis of the 3D-positions of the target points and/or control the coordinate measuring machine on the basis of the command corresponding to the identified movement.

13. The coordinate measuring machine according to claim 1, wherein the controller is configured to determine, while the first range camera moves together with the probe head, a distance between the first range camera and the object.

14. The coordinate measuring machine according to claim 13, wherein, if the distance between the first range camera and the object falls below a threshold value, the controller is configured to adjust the measurement path and/or to cause the drive mechanism to reduce a movement speed of the probe head.

15. The coordinate measuring machine according to claim 8, wherein the controller is configured to control the drive mechanism on the basis of the command corresponding to the identified movement.

16. The coordinate measuring machine according to claim 8, wherein the movement of the user comprises a pointing of a user to a pointing direction, and the controller is configured to control the drive mechanism on the basis of the command corresponding to the pointing direction.

17. The coordinate measuring machine according to claim 8, wherein the actions for which commands are predefined and which the controller is configured to perform comprise at least one of:
resetting the coordinate measuring machine,
ending or restarting the measuring process,
adding an additional measurement point, and
skipping pre-selected measurement points.

18. The coordinate measuring machine according to claim 8, wherein the movement of the user comprises a movement of one or more extremities of the user.

19. The coordinate measuring machine according to claim 12, wherein the controller is configured to control the drive mechanism on the basis of the command corresponding to the identified movement.

20. The coordinate measuring machine according to claim 12, wherein the movement of the user comprises a pointing of a user to a pointing direction, and the controller is configured to control the drive mechanism on the basis of the command corresponding to the pointing direction.

21. The coordinate measuring machine according to claim 12, wherein the actions for which commands are predefined and which the controller is configured to perform comprise at least one of:
resetting the coordinate measuring machine,
ending or restarting the measuring process,
adding an additional measurement point, and
skipping pre-selected measurement points.

22. The coordinate measuring machine according to claim 12, wherein the movement of the user comprises a movement of one or more extremities of the user.

23. The coordinate measuring machine according to claim 12, wherein the measuring sensor is a tactile measuring sensor.

* * * * *